United States Patent [19]

Towsend

[11] 4,040,605
[45] Aug. 9, 1977

[54] MAGNETIC STIRRING APPARATUS

[76] Inventor: Marvin Stanley Towsend, 1365 Potomac Heights Drive, Oxon Hill, Md. 20022

[21] Appl. No.: 705,113

[22] Filed: July 14, 1976

[51] Int. Cl.² .......................... B01F 7/00; B01F 13/08
[52] U.S. Cl. .............................. 259/64; 259/DIG. 46
[58] Field of Search ...................... 259/61, 64, 99, 102, 259/DIG. 46

[56] References Cited

U.S. PATENT DOCUMENTS

| 2,350,534 | 6/1944 | Rosinger | 259/DIG. 46 |
|---|---|---|---|
| 2,518,758 | 8/1950 | Cook | 259/DIG. 46 |
| 3,376,878 | 4/1968 | Shoemaker | 259/99 X |
| 3,680,843 | 8/1972 | Lu | 259/DIG. 46 |
| 3,807,704 | 4/1974 | Janzen | 259/DIG. 46 |

Primary Examiner—Edward J. McCarthy

[57] ABSTRACT

A magnetic stirring apparatus is disclosed having the capability of stirring the liquid contents of a plurality of containers, each having a magnetic stir bar placed therein. The apparatus has an energy source which drives a group of drive magnets whose magnetic fluxes are translated beneath a horizontal support surface of low magnetic permeability in a predetermined pattern of parallel lines or concentric circles. Upon the surface, the plurality of containers, having the magnetic stir bars therein, are placed. The repetitive translation of the magnetic fluxes of the group of drive magnets in a predetermined pattern of parallel lines or concentric circles defines a continuous region on the horizontal support surface serving as magnetic driver for the magnetic stir bars in containers placed upon it. This continuous region provides an indeterminate number of positions for placement of the containers to be stirred along its extent, as opposed to providing a predetermined number of discrete stations. Interaction between the translating magnetic fluxes of the drive magnets beneath the horizontal support surface and the magnetic stir bars above the horizontal support surface causes rotational motion of the magnetic stir bars, thereby stirring the contents of the containers.

13 Claims, 7 Drawing Figures

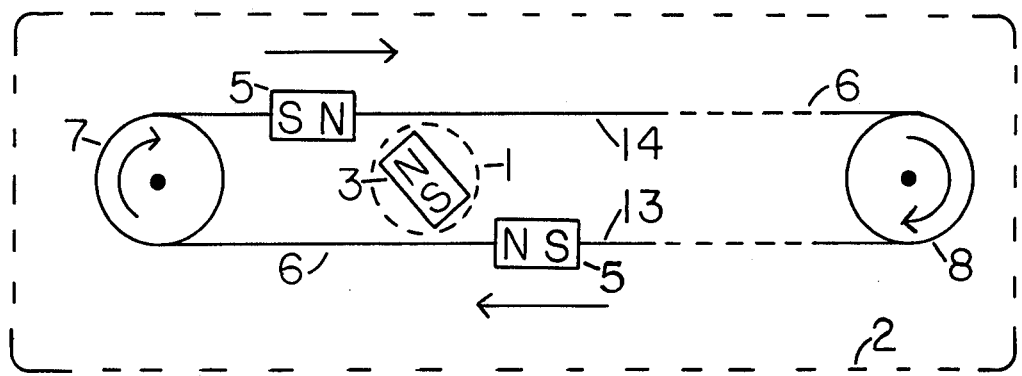
FIG.2
FIG.3
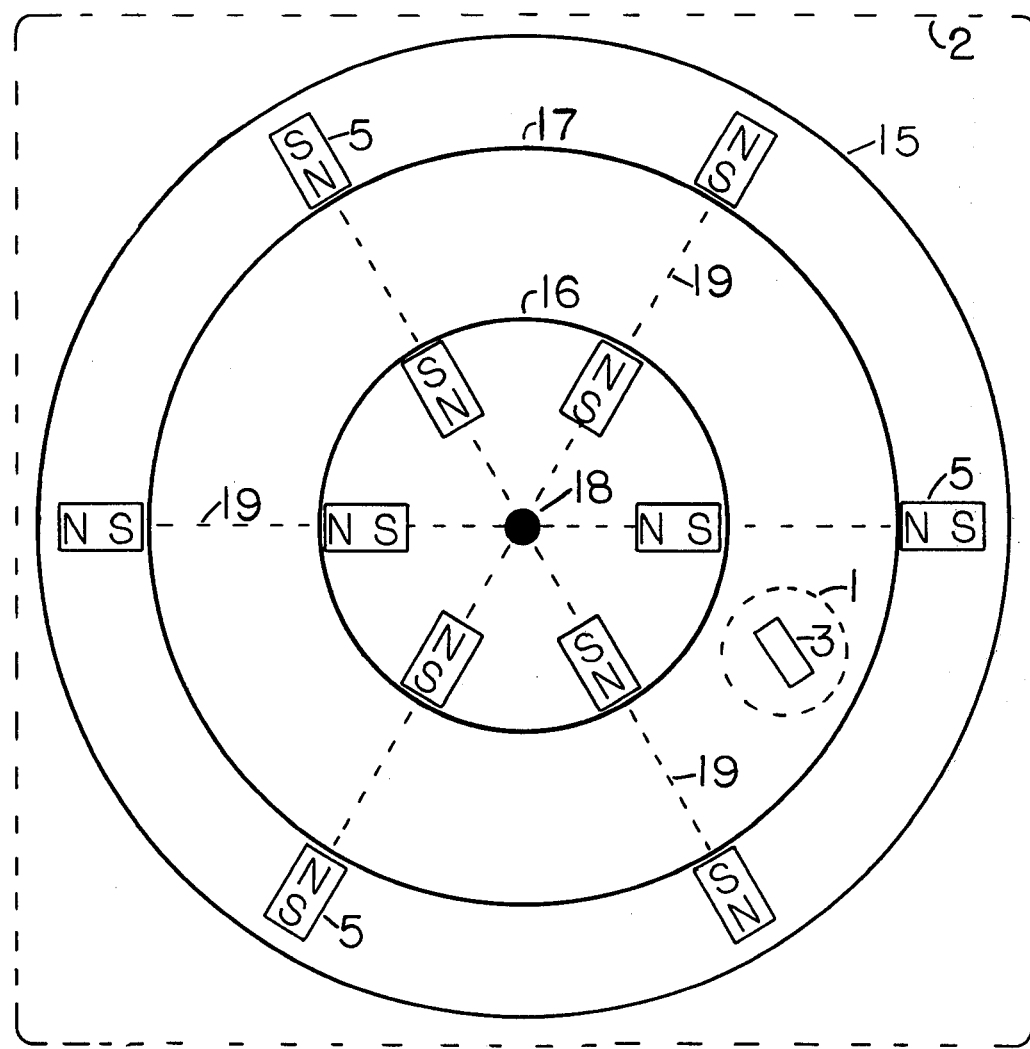

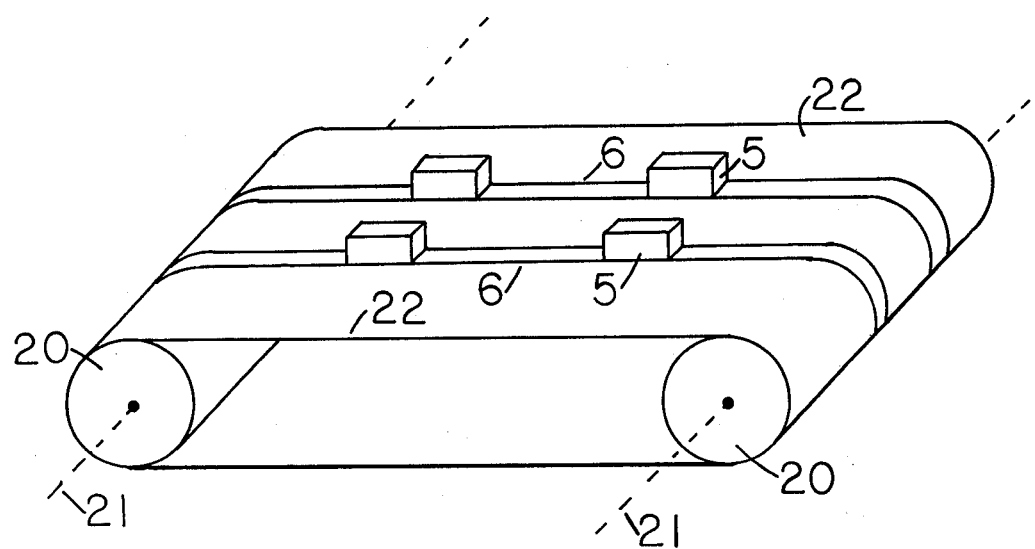
FIG. 4
FIG. 5
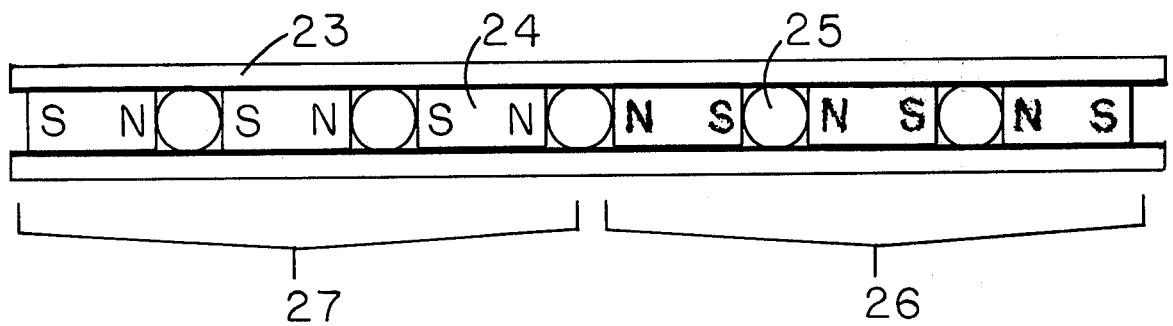

MAGNETIC STIRRING APPARATUS

BACKGROUND OF THE INVENTION

Devices are known having the capability of stirring or agitating the liquid contents of a plurality of containers simultaneously. Devices designed for shaking shake both the container and its contents. Shaking is impractical when the containers are open at the top, such as beakers commonly used in laboratories; and the liquid contents may be spilled out.

With devices designed for stirring, the containers remain stationary; and only the contents of each container is stirred. Stirrers are suitable for liquids in open containers.

Stirrers with magnetic drive are known having a plurality of discrete stations with the capability of stirring a plurality of containers simultaneously where each station accommodates one container. The maximum number of containers that can be stirred simultaneously, therefore, is limited by the number of discrete stations provided.

It is an object of the present invention to provide a magnetic stirring apparatus on which a plurality of containers can be stirred simultaneously without the need for and the limitations imposed by a predetermined number of discrete stations onto which individual containers are placed.

SUMMARY OF THE INVENTION

The invention is a novel magnetic stirring apparatus including an energy source and a group of drive magnets placed beneath a horizontal support surface of low magnetic permeability. The magnetic fluxes of said group of drive magnets are driven by said energy source and are maintained in continuous translation with respect to said horizontal support surface in a predetermined pattern of parallel curves; that is, parallel lines or concentric circles. Placed upon said support surface are a plurality of containers of low magnetic permeability, each having a magnetic stir bar therein. The interaction of the magnetic lines of force of the group of drive magnets with the magnetic stir bars imparts rotational motion to the magnetic stir bars thereby stirring the contents of the containers in which the magnetic stir bars are placed.

The repetitive translation of the magnetic fluxes of the group of drive magnets in a predetermined pattern of plural curves defines a continuous region on the horizontal support surface which serves as a magnetic driver for plural containers each having a magnetic stir bar. The number of containers that can be accommodated for stirring simultaneously on the horizontal support surface is limited only by the size of the continuous magnetic driver region and the size of the containers.

The novel features characteristic of the invention both as to its organization, method of operation, and methods of application together with additional objectives, features, and advantages thereof will best be understood by the description presented below when read in connection with the accompanying drawing.

Although several specific embodiments of the invention have been selected for illustration in the drawing, and although the description presented below relates especially to these specific illustrated embodiments of the invention, this description is not intended to limit the scope of the invention which is defined in the claims.

DESCRIPTION OF THE DRAWING

FIG. 2 illustrates how torque is imparted to the magnetic stir bars by the translating magnetic fluxes.

FIG. 3 shows an embodiment of the invention employing translating magnetic fluxes in concentric circles.

FIG. 4 shows an essentially two dimensional planar endless band having thereon two parallel essentially one dimensional linear endless belts and rotating on two cylindrical drums.

FIG. 5 shows a configuration of small magnets housed inside a hollow endless belt.

DETAILED DESCRIPTION OF THE INVENTION

Figure 1:
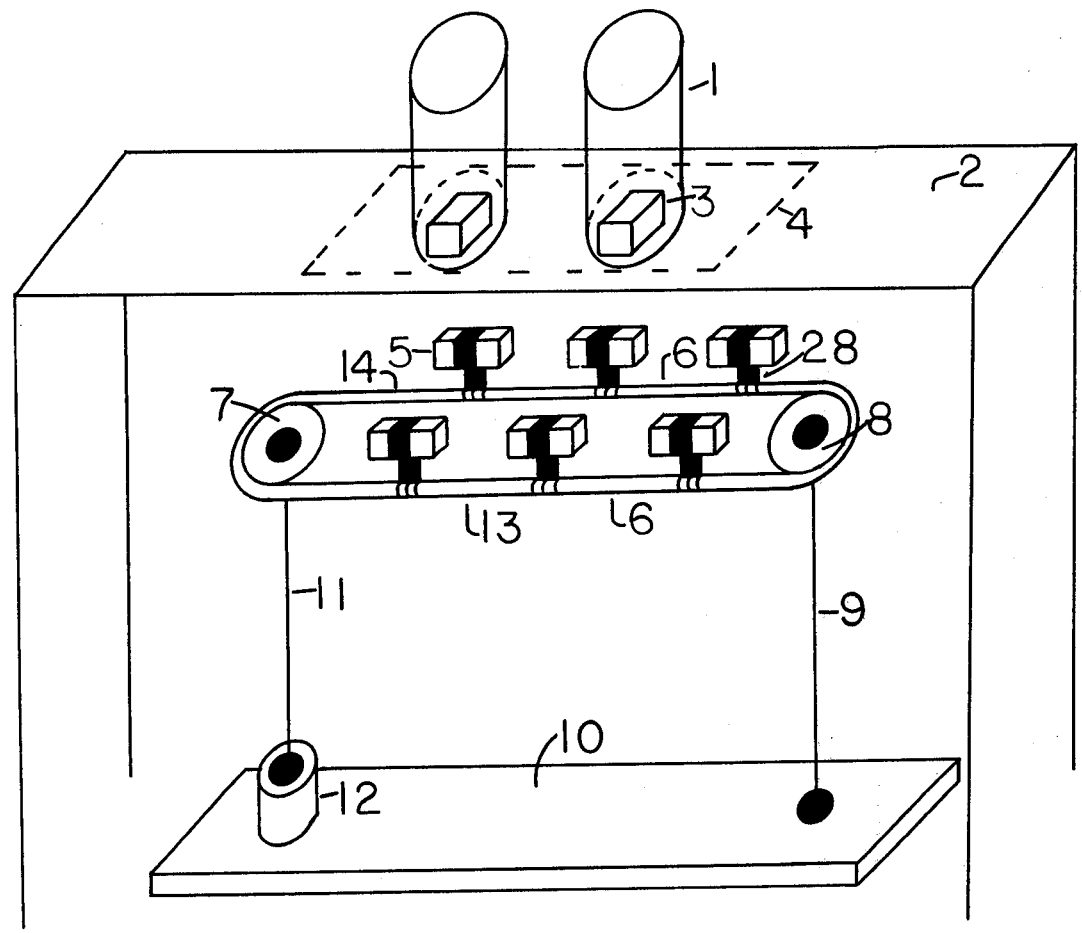
FIG. 1 shows an embodiment of the invention employing translating magnetic fluxes in parallel lines.

In FIG. 1, one embodiment of the invention is illustrated. Glass beakers 1 containing a liquid are placed upon a horizontal support surface 2, and each beaker is provided with a magnetic stir bar 3. The beakers may be placed anywhere along the continuous stirring region 4 of the horizontal support surface 2 where discrete individual stirring stations are not necessary. Beneath the horizontal support surface 2, a group of drive magnets 5 are mounted on an endless belt 6 in a horizontal plane by means of thin bands 28 around their centers. The endless belt 6 is supported by two pulleys, the drive pulley 7 and the return pulley 8. The return pulley 8 rotates on the return pulley axle 9 which is supported by the apparatus base plate 10. The drive pulley 7 is connected to the drive shaft 11 which in turn connects with the motor 12 which is supported by the apparatus base plate 10.

When motor 12 is energized, drive shaft 11 is rotated, driving the drive pulley 7 causing endless belt 6 to move in continuous circuit. Thusly, the group of drive magnets 5 mounted on the endless belt 6 are revolved continuously around the two pulleys 7 and 8. Thereby the magnetic fluxes of the group of drive magnets 5 are continuously translated in a pattern of two parallel lines 13 and 14 with respect to the stationary horizontal support surface 2. The magnetic fluxes of the magnetic stir bars 3 thereby interact with the moving magnetic fluxes of the group of drive magnets 5 and are caused to move rotationally in a horizontal plane thereby stirring the contents of the beakers 1.

FIG. 2 illustrates in greater detail the operating principle of the embodiment of the invention illustrated in FIG. 1. Viewed from above, the horizontal support surface 2 is made transparent allowing view of the endless belt 6, the mounted group of drive magnets 5, the drive pulley 7, and the return pulley 8. A beaker 1 is outlined containing its magnetic stir bar 3. For purposes of illustration, the group of drive magnets 5 are oriented along the endless belt 6 with their magnetic poles in a repetitive N-S arrangement. As the drive pulley 7 drives the endless belt 6 clockwise, it is seen that the group of drive magnets 5 are translated in a pattern of two parallel lines 13 and 14 moving in opposite directions. Thus the magnetic fluxes of the group of drive magnets 5 are translated in parallel lines in opposite directions. These magnetic fluxes impart a varying torque on the magnetic stir bars 3 in a continuous region defined by parallel lines 13 and 14. The varying torque moves the magnetic stir bars 3 in a rotational manner in a horizontal plane. Thusly, the contents of the beakers 1 are stirred.

FIG. 3 illustrates another pattern for translation of the magnetic fluxes of the group of drive magnets 5 mounted beneath the horizontal support surface 2. In FIG. 3, the horizontal support 2 is made transparent and viewed from above. The group of drive magnets 5 are mounted on a disk 15 in two concentric circles 16 and 17. Although not specifically shown in FIG. 3, it is understood that the origin 18 of the circles 16 and 17 is connected to a drive shaft and motor, and the disk 15 is caused to rotate thereby. The rotating disk causes the group of drive magnets 5 to revolve around the center 18 of the disk in a pattern of concentric circles 16 and 17. Beakers 1, each containing a magnetic stir bar 3, are placed upon the horizontal support surface 2 in the continuous region between the concentric circles 16 and 17. By utilizing a variety of orientations of the revolving group of drive magnets 5 with respect to the rotational motion of the disk 15, a varying torque is imparted by the translating magnetic fluxes of the revolving group of drive magnets 5 to the magnetic stir bars 3 thereby moving them in a horizontal plane in a rotational manner thusly causing the contents of beakers 1 to be stirred.

One possible arrangement of the group of drive magnets 5 upon the disk 15 is having some of the magnets mounted along the inner circle 16 on lines 19 radiating from the origin 18 and varying the pattern of N-S magnetic pole orientation by alternating N inward and S outward orientation with N outward and S inward orientation. In conjunction with this arrangement for inner circle 16, the remainder of the group of drive magnets 5 are mounted along the outer circle 17 along the same radial lines 19 with similar variation of the N-S pole orientation by alternating N inward and S outward orientation with N outward and S inward orientation.

In FIG. 4, another embodiment of the invention is illustrated. Two cylindrical drums 20 are rotated around axes 21 which are horizontal. Two essentially one dimensional endless belts 6, each having a group of drive magnets 5, are attached in parallel to an essentially two dimensional planar endless band 22 which revolves around the two rotating drums 20. The topmost portion of the rotating band 22 moves in a horizontal plane thereby effecting interaction between the group of translating magnets in the endless band and the magnetic stir bars 3 (understood but not shown in this figure).

In FIG. 5, another embodiment of one aspect of the invention is illustrated. A portion 23 of an essentially linear endless belt is illustrated. It is shown to be hollow and to contain within it a plurality of small discrete magnets 24 separated from one another by spacers 25 of material of low magnetic permeability. By arranging a series of small magnets 24 in N-S repetitive arrangement, a larger N-S magnetic flux is created 26. By placing an adjacent series of small magnets 24 in opposite S-N magnetic flux 27 is created. The small discrete magnets 24, when taken in groups, thereby provide larger N-S and S-N oriented magnetic fluxes capable of imparting rotational movement in a horizontal plane to the magnetic stir bars.

In constructing specific embodiments of the present invention, a variety of alternative specific constructions may be developed based upon several facets of the invention.

With regard to mounting the group of drive magnets on an endless belt, the endless belt itself may be continuous with individual magnets attached to the belt by thin bands around their centers at intervals along the belt; or the magnets may be linked together forming a continuous chain which then serves as an endless belt.

When a group of drive magnets are translated in a pattern of parallel lines or concentric circles, the direction of movement of the magnetic fluxes may be unidirectional for adjacent lines or circles. On the other hand, the direction of movement for adjacent lines or circles may be opposite; that is, bidirectional.

Regarding the mounting of drive magnets on a disk, the individual magnets may be secured to the disk individually, or an all-encompassing plastic, adhesive-coated film may be applied to secure all of the drive magnets simultaneously.

Several variations of patterns of placement of drive magnets on an endless belt may be employed. First, along a belt, each drive magnet may have each of its magnetic poles repelling like poles on both of its neighboring drive magnets; or, second, several adjacent drive magnets may be placed with opposite poles in magnetic attraction permitting a cumulative increase in magnetic flux. A third variation is placement of the drive magnets on the endless belt so that lines through the N and S poles of the magnets are perpendicular to the direction of movement of the endless belt.

In the embodiments of the invention thus far disclosed and described, the method for translating the magnetic fluxes of the group of drive magnets which drive the magnetic stir bars is the actual translating of the group of drive magnets themselves. An alternative method for translating the magnetic fluxes of the group of drive magnets is the selective energizing of individual electromagnets distributed beneath the horizontal support surface. The electromagnets may be mounted in parallel lines or in concentric circles.

Figure 6:
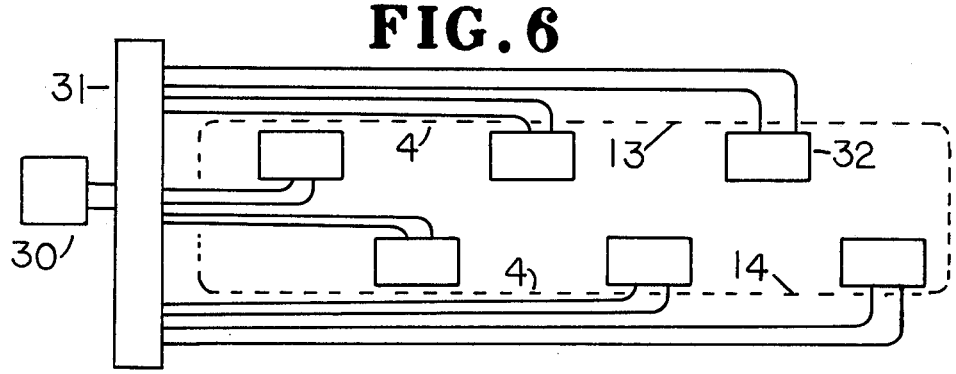
FIG. 6 shows electromagnets placed in parallel lines.

FIG. 6 shows the group of drive magnets to be electromagnets 32 arranged in two parallel lines 13 and 14. The selective energizing of the discrete electromagnets 32 is controlled by sequencer/cycler 31 which is powered by electrical power source 30.

Figure 7:
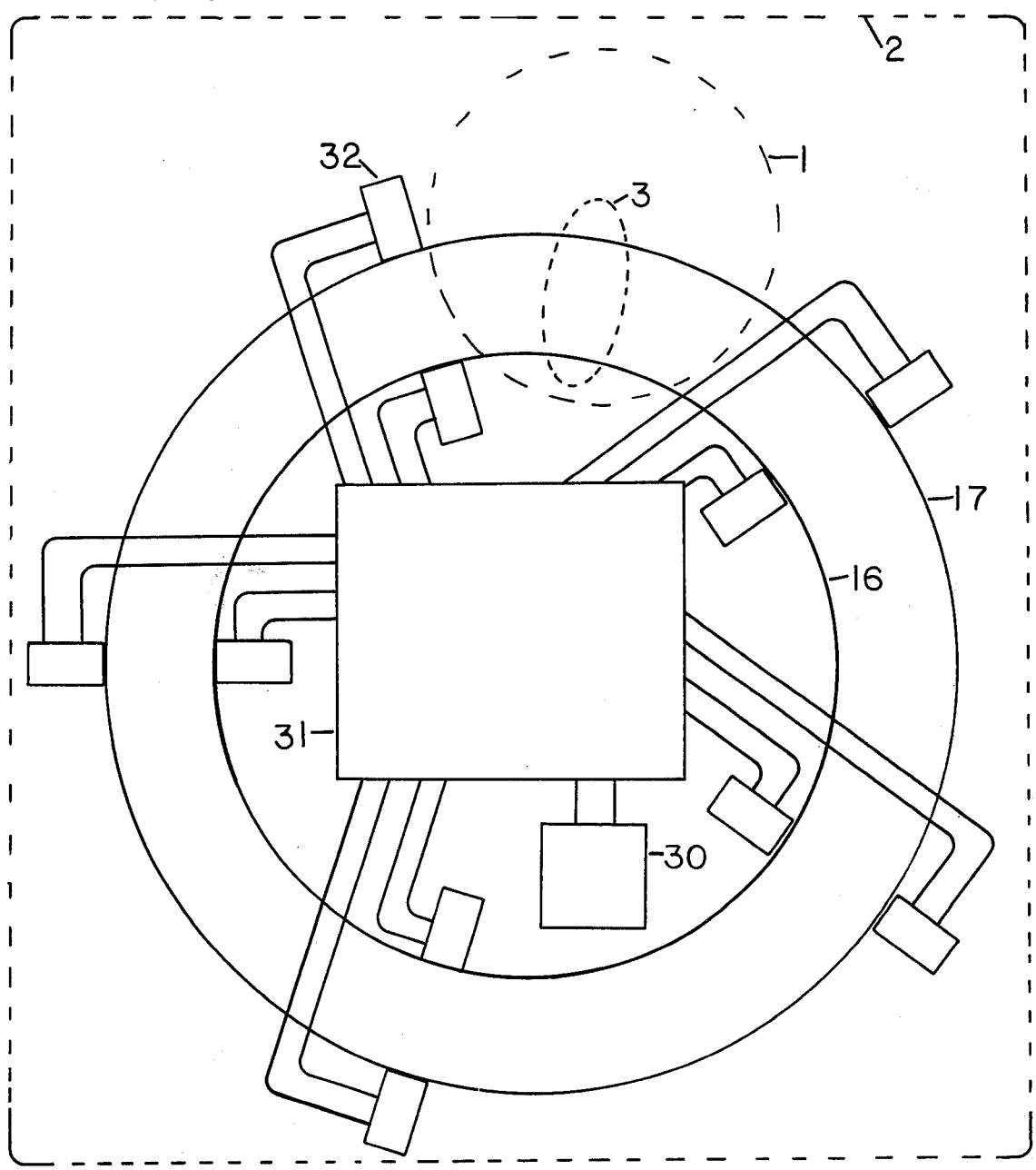
FIG. 7 shows electromagnets placed in concentric circles.

FIG. 7 shows the group of drive magnets to be discrete electromagnets 32 arranged in two concentric circles 16 and 17. The selective energizing of the discrete electromagnets 32 is controlled by sequencer/cycler 31 which is powered by electrical power source 30. The pattern of energizing may be such that the magnetic fluxes in the two parallel lines or in the two concentric circles are translated in opposite directions. The means for selective energizing of electromagnets may be electronic circuits employing solid-state components. When such means are employed, no moving parts are needed in the magnetic driving apparatus. By using electromagnets in this manner, the magnets themselves remain stationary; only their magnetic fluxes are translated.

What is claimed is:

1. A magnetic stirring apparatus for stirring the contents of plural containers each containing a magnetic stir bar, comprising:
   an energy source for driving the magnetic fluxes of a group of drive magnets;

a group of drive magnets, distributed in a first horizontal plane, whose magnetic fluxes are translated repetitively in a predetermined pattern of parallel curves which define a continuous stirring region by said energy source; and a horizontal support surface of low magnetic permeability, beneath which the magnetic fluxes of said group of drive magnets are repetitively translated in the predetermined pattern of parallel curves and upon which, in said continuous region defined by the predetermined pattern of parallel curves, the containers containing the magnetic stir bars are placed for rotationally agitating the magnetic stir bars in a second horizontal plane by their interaction with the repetitively translated magnetic fluxes of said group of drive magnets, for stirring the contents of the containers.

2. A magnetic stirring apparatus for stirring the contents of plural containers each containing a magnetic stir bar, comprising:

an energy source for driving the magnetic fluxes of a group of drive magnets;

a group of drive magnets, distributed in a first horizontal plane in a pattern of plural parallel lines which define a continuous stirring region and wherein the magnetic fluxes of said group of drive magnets are translated repetitively by said energy source in the predetermined pattern of plural parallel lines which define the continuous stirring region; and a horizontal support surface of low magnetic permeability, beneath which the magnetic fluxes of said group of drive magnets are repetitively translated in the predetermined pattern of plural parallel lines which define the continuous stirring region and upon which, in said continuous stirring region defined by the predetermined pattern of plural parallel lines, the containers containing the magnetic stir bars are placed for rotationally agitating the magnetic stir bars in a second horizontal plane by their interaction with the repetitively translated magnetic fluxes of said group of drive magnets, for stirring the contents of the containers.

3. A magnetic stirring apparatus as described in claim 2 wherein the magnetic fluxes of said group of drive magnets are translated repetitively in a predetermined pattern of plural parallel lines unidirectionally.

4. A magnetic stirring apparatus as described in claim 2 wherein the magnetic fluxes of said group of drive magnets are translated repetitively in a predetermined pattern of plural parallel lines bidirectionally.

5. A magnetic stirring apparatus as described in claim 2 wherein said energy source is a source of mechanical power; and wherein the source of mechanical power drives, in endless circuit, a moveable support which supports said group of drive magnets, which are discrete permanent magnets, thereby effecting repetitive translation of the magnetic fluxes of said group of drive magnets.

6. A magnetic stirring apparatus as described in claim 2 wherein said energy source is a source of electrical energy; and wherein the source of electrical energy is sequentially and cyclically applied to said group of drive magnets, which are discrete electromagnets, thereby effecting repetitive translation of the magnetic fluxes of said group of drive magnets.

7. A magnetic stirring apparatus as described in claim 5 wherein said power driven moveable support is an endless belt having a group of drive magnets attached; and wherein said endless belt is guided by a drive pulley and a return pulley.

8. A magnetic stirring apparatus as described in claim 5 wherein said power driven moveable support is an endless band upon which two parallel endless belts having groups of drive magnets are attached, and beneath which two cylindrical drums serve as guides for said endless band.

9. A magnetic stirring apparatus for stirring the contents of plural containers each containing a magnetic stir bar, comprising:

an energy source for driving the magnetic fluxes of a group of drive magnets;

a group of drive magnets distributed in a first horizontal plane in a pattern of plural concentric circles which define a continuous stirring region, and wherein the magnetic fluxes of said group of drive magnets are translated repetitively by said energy source in a predetermined pattern of plural concentric circles which define a continuous stirring region; and a horizontal support surface of low magnetic permeability, beneath which the magnetic fluxes of said group of drive magnets are repetitively translated in the predetermined pattern of plural concentric circles and upon which, in said continuous stirring region defined by the predetermined pattern of plural concentric circles, the containers containing the magnetic stir bars are placed for rotationally agitating the magnetic stir bars in a second horizontal plane by their interaction with the repetitively translated magnetic fluxes of said group of drive magnets, for stirring the contents of the containers.

10. A magnetic stirring apparatus as described in claim 9 wherein the magnetic fluxes of said group of drive magnets are translated repetitively in a predetermined pattern of concentric circles unidirectionally.

11. A magnetic stirring apparatus as described in claim 9 wherein the magnetic fluxes of said group of drive magnets are translated repetitively in a predetermined pattern of concentric circles bidirectionally.

12. A magnetic stirring apparatus as described in claim 9 wherein said energy source is a source of mechanical power; and wherein the source of mechanical power drives, in endless circuit, a moveable support which supports said group of drive magnets, which are discrete permanent magnets, thereby effecting repetitive translation of the magnetic fluxes of said group of drive magnets.

13. A magnetic stirring apparatus as described in claim 9 wherein said energy source is a source of electrical energy; and wherein the source of electrical energy is sequentially and cyclically applied to said group of drive magnets, which are discrete electromagnets, thereby effecting repetitive translation of the magnetic fluxes of said group of drive magnets.

* * * * *